Nov. 19, 1940.  F. T. COURT  2,222,282
CORN SHELLER
Filed March 18, 1939  2 Sheets-Sheet 1
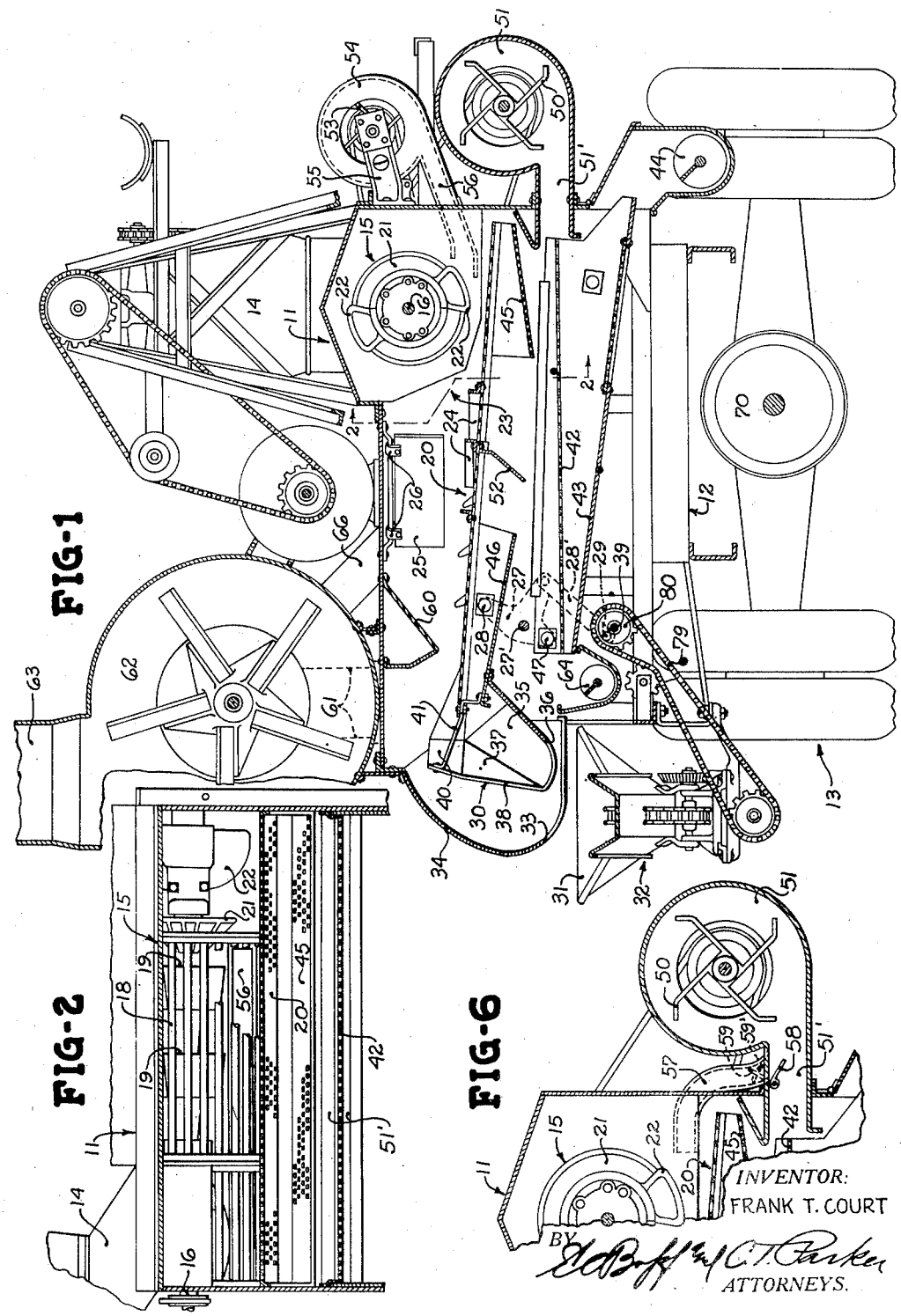
INVENTOR:
FRANK T. COURT
BY
ATTORNEYS.

Nov. 19, 1940.  F. T. COURT  2,222,282
CORN SHELLER
Filed March 18, 1939  2 Sheets-Sheet 2
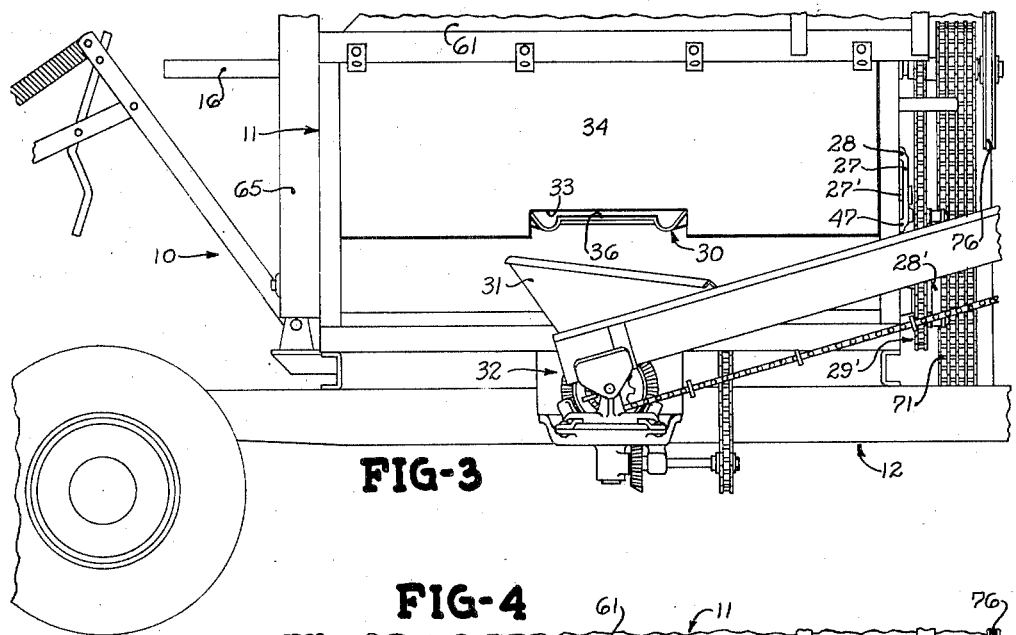
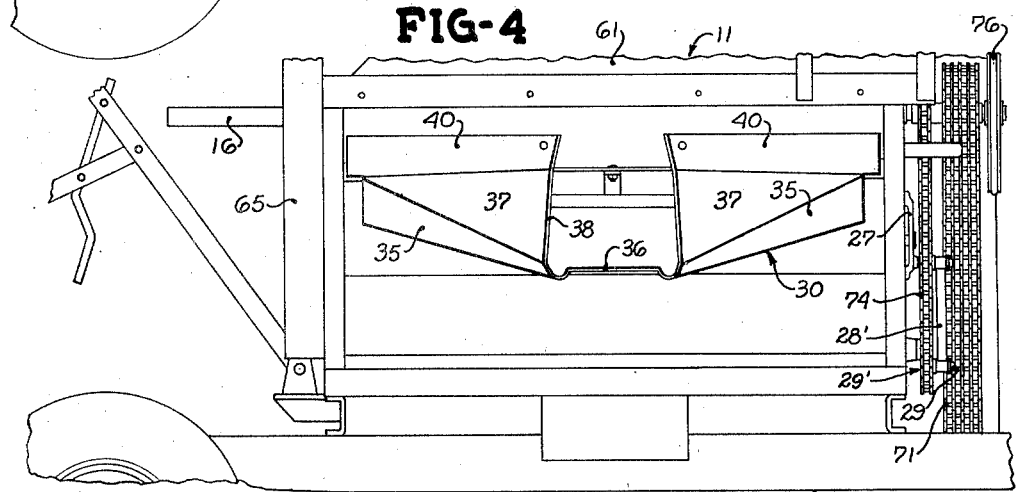
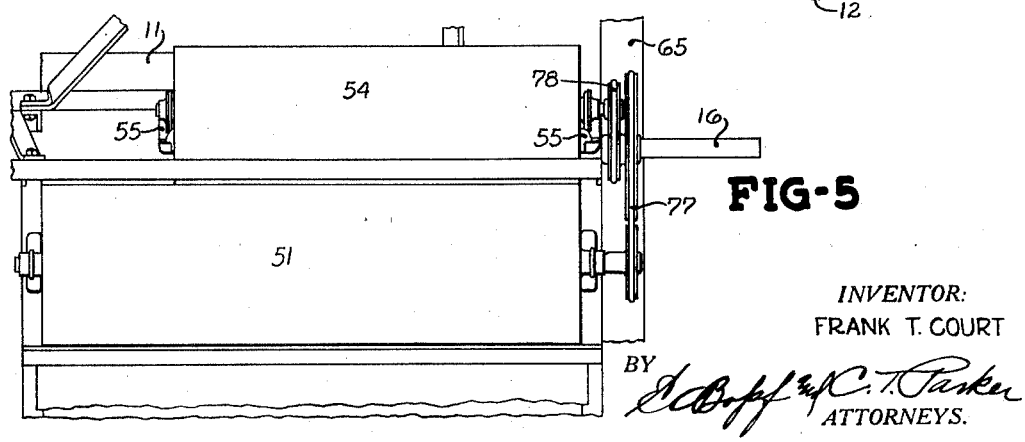
*INVENTOR:*
FRANK T. COURT
BY
*ATTORNEYS.*

Patented Nov. 19, 1940

2,222,282

UNITED STATES PATENT OFFICE 2,222,282

CORN SHELLER

Frank T. Court, Moline, Ill., assignor to Deere & Company, Moline, Ill., a corporation of Illinois Application March 18, 1939, Serial No. 262,793

4 Claims. (Cl. 130—6)

The present invention relates generally to corn shellers, and more particularly to the means for securing complete separation of the kernels of corn from the cobs and husks, and has for its general object the improvement in efficiency of the separating mechanism. When the silks are allowed to fall upon the shoe directly beneath the shelling cylinder, the ends of the strands are frequently driven through the perforations in the sieve by the kernels of corn being ejected through the shelling cylinder at relatively high velocity and which strike the shoe sieve substantially perpendicularly at this point. The silks thus caught may be removed only by opening the main housing and cleaning the silks out by hand. This necessitates stopping the machine, which means a loss of time. Further, the efficiency of the cleaning shoe is impaired when partially clogged by silks thus threaded through the sieve perforations directly below the shelling cylinder, particularly since this portion of the cleaning shoe receives from the shelling cylinder the greatest amount of corn per unit area. It is therefore one of the specific objects of this invention to provide means in a corn sheller for preventing such clogging.

A further object is to provide a hopper spout adapted to be fixed to the discharge end of the cleaning shoe and extending across the full length thereof whereby the cobs, which are uniformly distributed upon the cleaning shoe over the entire area thereof, are deflected into a narrow stream only after dropping from the edge of the shoe, for the purpose of pouring them into an elevator hopper. Heretofore means has been provided on the surface of the shoe itself for bunching the cobs as they approach the end of the shoe. By bunching the cobs after they leave the cleaning surface of the shoe, the efficiency of the shoe is maintained at a maximum.

These and other objects and advantages of the present invention will become apparent after a consideration of the following detailed description of a preferred embodiment thereof, reference being had to the appended drawings, in which Figure 1 is a transverse vertical sectional view of the complete corn sheller, which is shown as mounted on an automobile truck;

Figure 2 is a sectional view through the sheller housing, taken substantially along the line 2—2 in Figure 1;

Figure 3 is a fragmentary side elevational view as seen from the left in Figure 1;

Figure 4 is a view similar to Figure 3, but with the hood removed to show the hopper spout on the end of the cleaning shoe;

Figure 5 is a fragmentary side elevational view of the corn sheller as seen from the right in Figure 1 and showing the relative lengths of the blower fan housings; and Figure 6 is a fragmentary vertical sectional view of a modified form of my invention, showing an air duct for diverting a portion of the air blast from the main cleaning fan and directing it across the cleaning shoe under the shelling cylinder.

Referring to the drawings, the corn sheller is indicated in its entirety by the reference numeral 10 and includes a housing 11 mounted upon the frame 12 of a motor truck 13, the sheller being disposed transversely on said frame as best shown in Figure 1. Any suitable means may be provided for securing the sheller 10 to the truck frame 12, and since such means forms no part of the present invention, it is not deemed necessary to describe the same herein.

Except for the improvements with which my present invention is more particularly concerned and which will be described later in detail, the sheller itself is generally similar to that disclosed in the co-pending application, Serial No. 231,626, filed by William A. Hyland and George R. Louthan on September 26, 1938, and, therefore, only such parts of the sheller will be described in the present application as are necessary for an understanding of the present invention. For further details of the sheller construction, reference may be had, if desired, to the above mentioned co-pending application.

The ears of corn are delivered by a main feeder (not shown) to a hopper 14 which discharges them into the rear or inlet end of a sheller cylinder or cage 18 that forms a part of the shelling mechanism, indicated in its entirety by the reference numeral 15. The shelling beater and associated rotating elements are mounted on a shaft 16 that is rotatably supported in any suitable manner in the front and rear walls of housing 11, the sheller cylinder being disposed in a portion of the main housing.

The ears of corn are urged forwardly through the sheller cage and are acted upon in the usual manner by shelling beaters 19 of conventional construction. By the action of these shelling beaters, the ears of corn are rubbed together and against the shelling cage to remove the kernels of corn from the cobs as is usual in corn sheller operation. The kernels of corn drop through the shelling cage onto a cleaning shoe 20, and are further acted upon by air blasts, as will be explained hereinafter. The shelled cobs and husks are ejected from the sheller cage through an outlet opening having a cone shaped cob retarding gate or damper 21 disposed therein, and a cob distributor 22. The retarding gate 21 and distributor 22 form the subject matter of the aforementioned co-pending application of Hyland and Louthan, to which reference may be had for details of construction and operation thereof. It is deemed sufficient for the purpose of the present invention to bring out that the cob distributor 22 comprises a pair of blades mounted on the cylinder shaft 16 so as to revolve therewith, and acting to throw the cobs and husks out of the shelling cage portion of the housing 11 through an opening 23 and across the length of the cleaning shoe 20. The cleaning shoe 20 is disposed alongside of and extends the entire length of the sheller cylinder housing.

The distribution of the cobs and husks equally over the entire cleaning shoe 20 is aided and promoted by angle iron guides 24 secured to the upper surface of the shoe 20 and extending diagonally outwardly and rearwardly from the opening 23. A sheet metal vane or flap 25 supported on hinges 26 from the top of the housing 11 and extending downwardly to a short distance above the shoe 20, prevents cobs from being thrown directly outward across the shoe. The flap 25 is diagonally disposed in the housing, approximately parallel to the angle bars 24 on the shoe, for the purpose of deflecting the cobs to the other end of the shoe as they are thrown by the blades 22, and is hinged so that it is free to swing outwardly to prevent cobs from jamming behind it.

The cleaning shoe 20 is inclined upwardly from the side adjacent the sheller housing to the opposite or cob-ejecting side thereof so as to have a slight retarding action on the material delivered thereto and insure better separation of the kernels of corn from among the cobs and husks. The cleaning shoe 20 is also oscillated or reciprocated in the usual manner by a bell crank 27 that is pivoted on a pin 27' and is connected at 28 to the shoe. The bell crank 27 is rocked by a pitman 28' that is connected to a crank pin 29 on a sprocket 29' fixed to a shaft 39 which is driven as hereinafter described. The oscillating, or reciprocating motion thus imparted to the cleaning shoe 20 serves to agitate the cobs and cause them to work their way out to the cob-ejecting side thereof where they are discharged into a hopper chute 30 and thence into the receiving trough 31 of the cob stacker 32. The hopper chute 30 extends along the entire length of the outer edge of the cleaning shoe 20 and is fixedly secured to the shoe so as to reciprocate therewith. The main body of the hopper is disposed below the edge of the shoe 20, and comprises downwardly converging side walls 35 that terminate at the lower end thereof in a central discharge opening 36 directed through an opening 33 in the under side of a hood 34 that is fixed to and extends outwardly from the main housing 11. The outer wall 37 of the hopper is divided down the middle by a gap 38 of the width of the discharge opening 36, and is connected to the shoe 20 by two brace bars 41 disposed on opposite sides of the gap 38 adjacent the edges thereof.

The upper edge of the outer wall 37 is extended above the edge of the cleaning shoe 20 for a short distance to provide a backboard 40 that serves to stop any flying cobs and deflect them downwardly into the hopper. From the foregoing it will be seen that the cobs maintain their relatively uniform distribution on the cleaning shoe all the way out to the discharge edge thereof, and are bunched together into a narrow stream after dropping over the edge of the shoe. By reason of this uniform distribution of the cobs on the shoe, and the increased effective area of the cleaning shoe, the efficiency of the latter has been increased and a more complete separation of the kernels from the cobs is secured.

Below the shoe 20 is a second shoe or sieve 42, said second shoe being inclined slightly downwardly from the side adjacent the shelling mechanism 15, and perforated to allow the kernels of corn which drop thereon from the shoe 20 to drop down into a pan 43. The second shoe 42 is likewise oscillated by the bell crank 27 and is pivotally connected therewith by a pivot pin 47. The pan 43 is inclined downwardly in the opposite direction to that of the inclination of the sieve 42, or to the right as viewed in Figure 1, to permit the shelled corn to fall into a conveyor 44. A short inclined perforated sieve 45 is secured to the under side of the shoe 20 directly below the shelling mechanism 15 so as to deposit the shelled corn more evenly on the lower sieve 42, and a sheet metal inclined chute 46 is attached to the outer end of the upper shoe 20 below the same to direct the shelled corn back to the center of the lower sieve 42.

A centrifugal blower 50 is mounted on the side of the main housing 11 for directing a blast of air above and below the lower sieve 42 to keep the sieve clear of dust and chaff, and to separate any dust or other light material from the kernels of corn as they drop through the several sieves, and carry the same away. The blower 50 is contained within a generally cylindrical housing 51 which extends across the full width of the housing 11 and is provided with an air duct 51', for directing the air blast across the entire width of the lower sieve 42. A baffle plate 52 extending downwardly from the shoe 20 a short distance in front of the chute 46 directs the air from the blower 50 away from the chute to prevent kernels of corn from being blown rearwardly thereon and out through the hopper 30 with the cobs.

A second fan or blower 53 is disposed above and parallel to the fan 50 in a generally cylindrical housing 54 mounted on the main housing 11 on supporting brackets 55. Blower 53 is provided with a discharge duct 56 which projects through the end wall of the housing 11 in a downwardly inclined direction, extending to and terminating at a point below the shelling cylinder 15 and above the cleaning shoe 20. Duct 56 is of relatively narrow width and extends the full length of the shelling cylinder, as is shown in Fig. 2. With the end of the duct 56 so positioned, a concentrated high velocity blast of air is directed into the space between the upper surface of shoe 20 and the lower side of the shelling mechanism 15, over the full length of the latter. Such concentrated blast effectively prevents silks from falling onto the shoe directly beneath the cylinder and being driven through the perforations of the shoe by kernels of corn being projected out of the shelling mechanism at relatively high velocity and perpendicularly to the shoe at this point. The blast loses its concentration and high velocity immediately beyond the shelling cylinder, and thereafter does not interfere with the normal separating action of the shoe in conjunction with the relatively low velocity air passing through the shoe produced by blower 50 and induced by blower 60 described hereinafter. While I prefer to use a second and separate fan for blowing the silks out onto the shoe, as shown in the embodiment illustrated in Figures 1-5, inclusive a portion of the air blast from the main cleaning fan 50 can be diverted through a suitable duct and directed across the cleaning shoe beneath the shelling cylinder 15, a shown in Figure 6, to accomplish the same desired result. In this latter embodiment, an air duct 57 connects with the duct 51' and extends upwardly therefrom and into the sheller housing, discharging the air blast across the cleaner shoe 20 from substantially the same point as the duct 56. A damper 58 is pivoted in the duct 51' at the mouth of the duct 57 and serves as an air scoop to deflect a portion of the air from the fan 50 up into the duct 57. The quantity of air by-passed through the duct 57 is regulated by adjusting the damper 58 with a hand lever 59 which engages a notched sector 59' to lock the damper in adjusted position. Since this secondary air blast which is discharged by either the second fan 53 or duct 57, as the case may be, is for the sole purpose of blowing silks out from underneath the shelling cylinder 15, it is evident that the fan housing 54 or duct 57 need be only as long as the shelling cylinder itself, and therefore may be shortened to the extent of the width of the discharge gate 21 and cob distributor 22, as best shown in Figure 5.

The air blast from the upper fan 53 is deflected downwardly against the shoe 20 near the cob-discharging end thereof by a baffle 60 that is fixed to the top of the main housing 11, to separate any last remaining particles of dust or chaff from the cobs before they are discharged into the hopper 30. The husks and silks, together with the dust and chaff separated out from the corn by both fans 50 and 53, are drawn upwardly through an intake hood 61 into a blower 62 and discharged therefrom through a suitable pipe 63.

Any shelled corn that passes over the end of the lower sieve 42 opposite the discharge end thereof falls into a tailings conveyor 64 and is conveyed by a tailings conveyor 65 at the rear end of the main housing to a chute 66 from which it is discharged upon the upper shoe 20.

The power for operating the entire corn sheller is obtained from the main transmission shaft 70 of the motor truck 13 by means of a driving chain 71 trained over suitable sprockets on the shaft 70 and shelling cylinder shaft 16. Power is obtained from the shaft 16 to drive the sprocket 29' through a chain 74 to rock the bell crank 27 and thereby oscillate the cleaning shoes 20 and 42. The sprocket 29' is fixed to and drives the shaft 39, as brought out previously, and the drive for the cob stacker 32 is taken from the shaft 39 by a chain 79 trained over a drive sprocket 80 on the shaft.

The blower 62 is driven by a V-belt 76 from the front end of the cylinder shaft 16, while the fans 50 and 53 are driven by V-belts 77 and 78, respectively, from the rear end of the cylinder shaft 16, as best shown in Figure 5. Other units such as the shelled corn conveyor 44, tailings conveyor 64, and feeder conveyor are driven by suitable drives not shown in detail in the present application inasmuch as they form no part of this invention, and the details of their construction and operation may be found in the aforementioned copending application of Hyland and Louthan.

While I have shown what I consider to be the preferred embodiment of my invention, it will be understood that numerous changes and rearrangements may be made therein without departing from the essence of the invention.

What I claim as my invention is:

1. In a corn sheller having shelling means and separating means comprising two perforated screens disposed one above the other in spaced relation, said shelling means being disposed directly above the top screen, a fan having a pair of discharge ducts connected therewith and positioned to deliver two blasts of air through said separating means, one of said ducts extending to and terminating at a point beneath said shelling means to direct a concentrated air blast across the space directly above the top screen and directly below said shelling means for blowing silks out from underneath the shelling means to prevent them from falling upon that portion of the shoe directly beneath the cylinder, and the other of said ducts directing a blast between the two screens substantially parallel to the first blast for separating dust and chaff from the shelled corn.

2. In a corn sheller, an enclosed housing having an end wall, a rotatable shelling cylinder disposed within said housing adjacent said end wall, a cleaning shoe disposed within said housing, one end thereof extending to a point adjacent said end wall and below said cylinder, and blower means having a discharge duct projecting through said end wall in an inclined position over said end of said shoe and extending to a point beneath said cylinder to direct a concentrated blast of air into the space between said shoe and said cylinder to prevent silks discharged from said cylinder from falling upon the portion of the shoe directly beneath the cylinder, the upper inclined wall of said duct directing material discharged in the direction of said end wall upon said shoe through said air blast.

3. In a corn sheller, a shelling cylinder, a perforated cleaning shoe disposed with a portion thereof beneath said cylinder, and blower means having a discharge duct extending to and terminating at a point below said cylinder and above said shoe and extending substantially the full length of the cylinder and disposed to discharge an air blast along the top surface of said cleaning shoe below the cylinder substantially parallel to the shoe and transversely through the material being ejected from the shelling cylinder perpendicularly to the cleaning shoe, whereby corn silks in such material are carried to one side of the shelling cylinder and prevented from falling upon that portion of the shoe directly beneath the cylinder.

4. In a corn sheller, a shelling cylinder, a perforated cleaning shoe disposed with a portion thereof beneath said cylinder, blower means having a discharge duct disposed above said cleaning shoe to direct a blast of air along the top surface of the cleaning shoe below the cylinder substantially parallel to the cleaning shoe and transversely through the material being ejected from the shelling cylinder perpendicularly to the cleaning shoe, and means for concentrating the blast of air directly below the cylinder, whereby corn silks included in the ejected material are carried to one side of the shelling cylinder and prevented from falling upon that portion of the cleaning shoe directly beneath the cylinder.

FRANK T. COURT.